BAND EXPANSION RECORDER

Filed Sept. 12, 1955

INVENTOR
JOHN V. ELLISON

BY W R Maltby
Howard White
ATTORNEYS 2,903,521
Patented Sept. 8, 1959

2,903,521

BAND EXPANSION RECORDER

John V. Ellison, Washington, D.C.

Application September 12, 1955, Serial No. 533,926

2 Claims. (Cl. 179—100.2)

Figure 1:
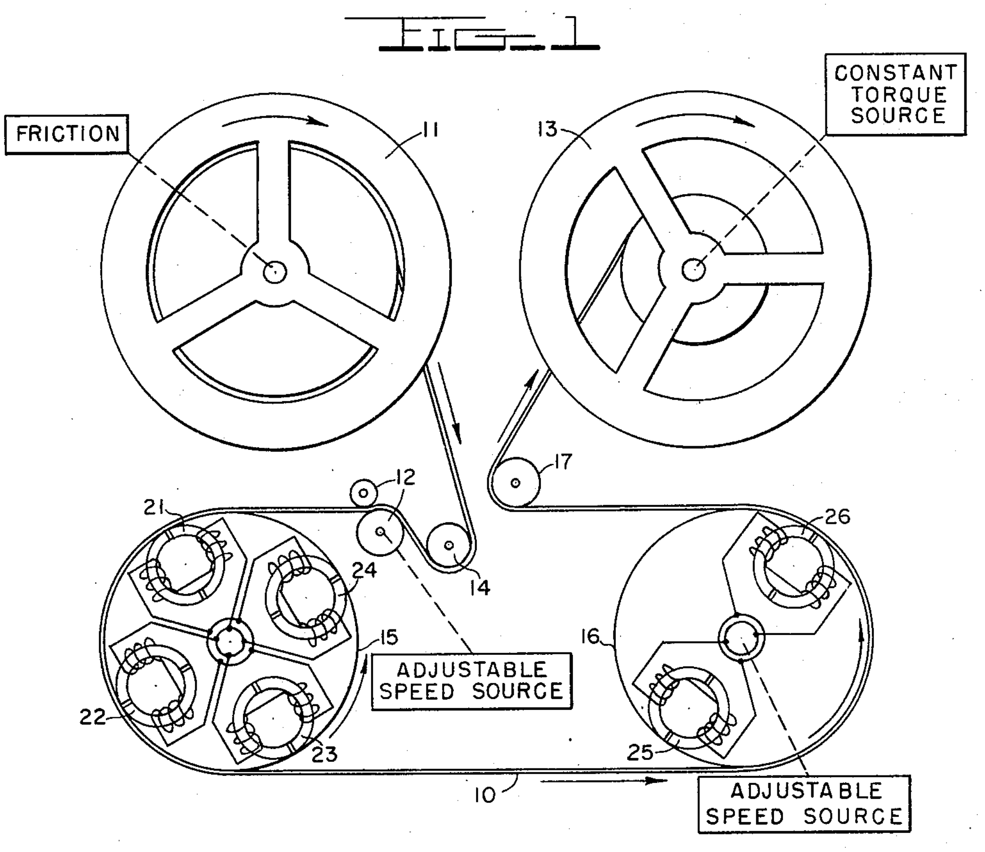

(Granted under Title 35, U.S. Code (1952), sec. 266)

The invention described herein may be manufactured and used by or for the Government of the United States of America for governmental purposes without the payment of any royalties thereon or therefor.

The present invention relates to a record/playback device and more particular to a frequency band-expansion recorder having an assemblage of rotating recording heads and an assemblage of rotating playback heads.

A band-expansion recorder is a device which accepts signals represented by a band of frequencies, records these signals, and reproduces them at an accelerated rate. By the process of acceleration, the signal frequencies are all increased by a common multiplying factor, resulting in an expanded band of signal frequencies at the output. In the present invention, advantage is taken of the redundancy present in the signal information to be processed. By means of multiple recording and playback heads mounted in rotating assemblies, the signals are repeatedly scanned at a relatively rapid rate to permit preservation of the timing during the band-expansion process.

In the prior art of record/playback devices, rotating playback heads have been used but there exists a problem of reducing wow and flutter due to variations in the speed of the record medium during recording, playback, or both.

The present invention makes use of rotating recording heads whereby the relative effective recording speed between the recording head assembly and a magnetic record medium is such that the record medium can be moved fast enough during recording and playback to reduce wow and flutter by means of speed stabilization techniques well known in the art. Wow and flutter are undesired characteristics found in recording and playback devices which are caused by irregularities in the speed of the record medium. They are nearly synonymous terms, the distinction being that wow is the signal frequency deviation resulting from non-uniform motion of the record medium recurring at relatively low rates, while flutter is the corresponding deviation resulting from non-uniform motion which occurs at relatively high rates. In order to reduce these undesired characteristics both the recording heads and the record medium are moved at relatively high, though different speeds to permit the effective use of flywheels and other speed stabilizing devices on both the recording head assembly and the record medium while maintaining a relatively low effective recording speed equal to the difference between the speeds of the recording heads and the record medium.

It is an object of this invention to reduce wow and flutter during recording and playback on a magnetic record medium.

Another object of the present invention is to expand uniformly a band of frequencies while preserving amplitude information without compressing time duration of signals occurring within the accepted frequency band.

A still further object of the present invention is to employ an assemblage of rotating recording heads as a recording means.

Yet another object of the present invention is to associate a recording means with a record medium to produce an effective recording speed which is different than the speed of the record medium.

A final object of the present invention is to enable anyone to rotate the recording heads associated with a playback means of a record/playback device to produce a desired frequency multiplication of the recorded signal.

Figure 2:
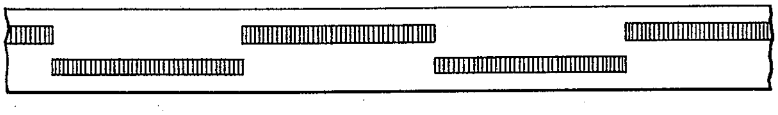
Figure 2:
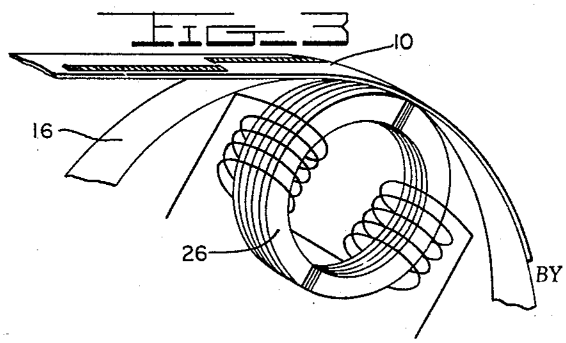

Other and more specific objects of this invention will become apparent upon a careful consideration of the following detailed description when taken together with the accompanying drawings, in which;

Fig. 1 is a simplified sketch illustrating the recording device and the relationship of the magnetic record medium to the rotatable recording and playback heads, Fig. 2 is a section of the record strip illustrating the magnetic track produced by separate recording heads on the rotating record head assembly, and Fig. 3 is a perspective view of one playback head illustrating the relationship of the head width and the double track record medium.

Referring now to the drawings there is illustrated a record/playback device comprising a magnetic record medium 10 adapted to be fed from a reel 11 which is equipped with a friction brake in order to maintain proper tension on the magnetic record medium. The record medium is fed from the reel 11 around an idler wheel 14 which acts as a guide, then through a metering device 12 which is adapted to be driven by an adjustable speed source. The metering device could be positioned after the playback assembly if desired. From the metering device the record medium is movably mounted around a rotatable recording head assembly 15 adapted to be driven at a peripheral speed which is less than the rate of the record medium, the record medium is then threaded around a rotatable playback assembly 16 which has an adjustable speed source and adapted to be driven at a peripheral speed greater than the rate of travel of the record medium. From the playback head assembly the record medium is positioned around a second idler guide wheel 17 and then is finally threaded onto a storage reel 13 which is adapted to be driven by a constant torque source to maintain proper tension on the record medium. It is obvious that other guides could be positioned along the record medium track wherever needed without departing from the invention.

The rotatable recording head assembly 15 as well as the rotatable playback head assembly 16 is formed of any well known magnetic head structure mounted along the circumference of a wheel having a rim made of a material with a low coefficient of friction which may be a plastic or a non-ferrous metal, non-ferrous metal being preferred.

The rotatable recording head assembly 15 for illustrative purposes comprises four recording heads 21, 22, 23 and 24, the heads are shown as electromagnetic devices having cores with short air gaps or slots across which the magnetic record strip travels. The signals are recorded perpendicular to the edges of the record strip, that is, across the record strip. The heads are equally spaced 90° apart along the surface of the recording head assembly such that alternate recording heads are offset to form pairs that record on separate, parallel tracks thereby successive recording heads record at the same time but on separate tracks as illustrated in Fig. 2. During recording, the record medium travels over and contacts one half of the peripheral surface of the recording head assembly and travels at a greater rate then the peripheral speed of the recording head assembly, one head starts recording on contact with the record medium and since the record medium is moving faster than the peripheral speed of the recording head assembly there will be slippage between the record medium and the recording head assembly. The slippage during ¼ of a revolution of the recording head assembly is such that the point of contact of the next successive recording head with the record medium will be at the point on the record medium where the preceding recording head will break contact with the record medium during the next ¼ revolution of the recording head assembly. When the recording heads are positioned alternately to record on separate tracks the recorded signal will appear as shown in Fig. 2 wherein the last half of the recorded signal from the preceding head is the same as the first half of the signal recorded by the succeeding head. All heads are connected with the same, common signal receiving source; therefore, at anytime the heads are contacting the record medium they will record the same signals.

Since the heads are positioned along the periphery of the recording head assembly at 90° intervals and the record medium contacts one half the peripheral surface of the recording head assembly, as soon as one head contacts the record medium and travels through one quarter of a revolution the next successive head contacts the record medium, and during the next quarter revolution of the recording head assembly and movement of the record medium over the recording head assembly the two heads contacting the record medium will record the same incoming signal. This positions the assembly such that the first contacting head is ready to break contact with the record medium, the second head has moved through a quarter revolution and the third successive head is positioned to make contact with the record medium as the first head breaks contact. This is a continuous operation, the two recording heads that are contacting the record medium record the same signal when in contact such that the last half of the recorded signal of the preceding head is the same as the first half of the recorded signal of the succeeding head. The preceding head during any recording period being the one in contact with the record medium during the time interval for one quarter of a revolution of the recording head assembly that occurs just before the said recording head breaks contact with the record medium, and the succeeding head being the one that is contacting the record medium during one quarter revolution of the record assembly from the moment of first contacting the record medium.

It is not necessary that alternate recording heads be positioned to record on separate tracks since it is obvious that they can record on one continuous track, also, the invention is not limited to one or two tracks but can be used with as many tracks and as many rows of recording and playback heads as desired.

Since the record strip travels at a faster rate than the recording assembly it is obvious that there will be slippage between the recording head assembly and the record medium. The difference in the distances covered over a period of half the time of a revolution of the recording head assembly being the effective recorded distance along the record strip by each individual head.

In order to get band-expansion, it is necessary to record the signals continuously without any overlap to prevent redundancy. This depends upon the speed of the record medium, the peripheral speed of the recording head assembly, the number of recording heads and the time that each recording head contacts the record medium during one revolution. The speed of the record medium can be any of the well known speeds such as 7.5 in./sec., 15 in./sec., 30 in./sec., etc. The formula $$t(S_t-S_r)=\frac{S_t}{N}$$

where $t$=time that any recording head during one revolution of the recording head assembly contacts the record medium, $S_t$=speed of the record medium in inches per sec., $S_r$=the peripheral speed of the recording head assembly in inches per sec. for each revolution and $N$=the number of heads that contact the record medium per sec., is used to determine the peripheral speed of the recording head assembly for any number of recording heads.

When the record medium contacts 50% of the peripheral surface of the recording head assembly a change in the number of pairs of recording heads requires a change in the peripheral speed of the recording head assembly to prevent redundancy. When the difference in the speeds between the record medium and the recording head assembly remains constant with a change in the number of heads then a change in the time per revolution that a recording head contacts the record medium must be changed.

As illustrated in Fig. 1, the record medium contacts 50% of the peripheral surface of the recording head assembly. At one r.p.s., the recording heads record on the record medium for one half second. When the record medium contacts 50% of the peripheral surface of the recording head assembly the number of heads must be in pairs and by varying the number of pairs of heads, the speed of the record medium must be changed.

In an alternative manner of recording, the speed of the record medium and the speed of the recording head assembly may be kept at the same speeds while the number of recording heads is changed. In this case in order to prevent signal redundancy the time ($t$) that any one recording head contacts the record medium during one revolution must be changed. Since the speeds remain constant and the time of contact changes, the point that the record medium breaks contact with the recording head assembly must be changed for different number of heads to obtain the proper recording angle.

Where the peripheral speed of the recording head assembly $S_r$ is one revolution per second, the peripheral speed in inches per sec. will then numerically equal the circumference of the recording head assembly, from this, the radius of the recording head assembly can be determined by the formula $C=2\pi r$. Also, as the recording head assembly makes one revolution per sec. and this speed in inches per sec. is numerically equal to the circumference, the point at which any record head must break contact with the record medium when the speeds are constant can be determined by the formula, $d=tS_r$, where $d$=the distance along the peripheral surface of the recording head assembly that a recording head contacts the record medium during one revolution of the recording head assembly, $t$=the time any one head contacts the record medium during one revolution of the recording head assembly, and $S_r$ the peripheral speed equals numerically the circumference of the recording head assembly.

In the illustrated example, the speed of the record medium is taken at 7.5 in./sec. and there are four recording heads along the periphery of the recording head assembly. Since the record medium contacts 50% of the periphery of the record medium and the recording head assembly has a speed of one revolution per second, any recording head will contact the tape for one half second; therefore, the time $t$=½ sec. Substituting the values into the formula $$t(S_t-S_r)=\frac{S_t}{N}$$

$$\tfrac{1}{2}\text{ sec. }(7.5\text{ in./sec.}-S_r)=\frac{7.5\text{ in./sec.}}{4/\text{sec.}}$$

$$7.5\text{ in.}-S_r\text{ sec.}=\frac{7.5\text{ in.}}{2}$$

$$S_r\text{ sec.}=7.5\text{ in.}-3.75\text{ in.}$$

$$S_r\text{ sec.}=3.75\text{ in./sec.}$$

therefore, the speed of the recording head assembly must be 3.75 in./sec. Since the recording head assembly makes one revolution per second the speed in inches per second will equal to the distance a point on the periphery travels in one second, this distance is equal to the circumference of the recording head assembly. From the formula $C=2\pi r$ the radius of the recording head assembly can be ascertained.

It has been found if the number of recording heads are two, then the recording head assembly would be driven at a speed which is exactly twice that of the record medium in order to have a continuous recording. In this example the same signal would not be repeated at any time along the record medium but it is not necessary to have a repeated recorded signal. When the signals are repeated during recording the speed of the playback head assembly will be less during playback.

In a record/playback device wherein the number of recording heads are two or more the ratio between the speed of the record medium and the speed of the recording head assembly can remain the same and the formula $$t(S_t-S_r)=\frac{S_t}{N}$$

can be used to determine the time that a recording head must contact the record medium to get a continuous and repeated signal recording on the record medium. In order to get a continuous signal with the last half of the signal recorded by a preceding head to be the same as the first half of the recorded signal from the immediately following head; either, the time that the record medium contacts the recording head assembly, or the speed of the recording head assembly must be changed, when there is a change in the number of recording heads. If the time of contact between the record medium and recording head assembly is constant then the speed of the recording head assembly must be changed. If the speed of the record medium and the recording head assembly remains constant with an increase or decrease of the number of heads, then the time of contact between the record medium and recording head assembly must be changed.

In either case the above formula can be used to determine either the speed of the recording head assembly or the time that a recording head must contact the record medium during one revolution of the recording head assembly for any desired number of recording heads and desired speed of the record medium.

In order to playback the recorded signal at an accelerated rate, a playback head assembly 16 which comprises playback heads 25 and 26 mounted 180° apart and having a head width wide enough to sweep the doubly recorded signal tracks is used. This assembly is rotated at a greater speed than the magnetic record medium which is movably mounted around one half the peripheral surface thereof in order to accelerate the frequency of the signals recorded on the magnetic medium. Since the last half of any one recorded signal from one recording head is the same as the first half of the recorded signal from the immediately succeeding head but on a different recorded track, the double track playback heads of the playback assembly sweep alternately the recorded signal of each recorded track. As the playback heads rotate, the signal of one recorded track is picked up by a playback head and as the playback head leaves the recorded signal on one track the same signal is immediately picked up by sweeping the recorded signal of the next adjacent magnetic track. Since the playback heads are 180° apart, as soon as one playback head breaks contact with the record medium the other playback head makes contact and immediately starts playing back the recorded signal. The playback heads, being of a type which sweeps the doubly recorded track, play back the recorded signals from one track and then the other without a break and since the playback assembly has a peripheral speed which is greater than the record medium, each signal will be reproduced over several times and the frequencies multiplied according to the relationship of the effective recording speed, the peripheral speed of the record medium and the peripheral speed of the playback head assembly.

In the operation of the device the recording heads and the playback heads are electromagnetic devices having cores with short air gaps or slots across which the magnetic record medium travels, for the playback heads the width of each head is wide enough to cover both tracks recorded by the recording heads. The recording head assembly rotates as the record medium moves over the heads but the peripheral speed of the recording head assembly is less than the record medium; therefore, the signal being recorded will be recorded along that portion of the record medium which is the difference in the distance traveled between the periphery of the recording head assembly and the record medium during contact.

The record medium travels from the recording head assembly to the playback head assembly wherein the playback heads rotate at a peripheral speed which is greater than the speed of the record medium. The playback heads sweep the recorded signal a multiple number of times during an interval equal to a single recording interval whereby the frequency band is multiplied according to the peripheral speed of the playback head assembly and the effective signal recording speed of the record medium while the effective time duration of the signals remain unchanged.

In the illustrated example of Fig. 1 the signals are fed into all of the recording heads from a common source and two of the recording heads are recording on the record medium at all times but on alternate tracks. As shown, recording heads 21 and 22 are recording the same signal and when recording head 22 breaks contact with the recording medium, the recording assembly will have rotated so that recording head 24 will make contact at the same time. The signal recorded by each succeeding head on contacting the record medium for the first ¼ revolution of the recording head assembly after making contact will be the same as the signal recorded by the preceding head during the second ¼ revolution of the recording head assembly; therefore, any two heads are always recording the same signal but on separate tracks. Since the signals recorded by each successive head is the same for one half the recording interval; each playback head sweeps the same signal a multiple number of times while the recording medium is contacting the playback head assembly.

The playback assembly can be rotated in either direction to have the same frequency multiplication factor. The assembly must be rotated faster when rotated in the direction of the record medium than it is when rotated in a direction opposite that of the record medium.

For any frequency multiplication factor X, the following formula, $$X=\frac{S_P\pm S_t}{S_t-S_r}$$

can be used to determine the unknown, where $X$=the frequency multiplication factor; $S_t$=speed of the record medium; $S_r$=peripheral speed of the recording head assembly; and $S_p$=peripheral speed of the playback head assembly. In the formula, if the playback assembly is rotated in the direction of the travel of the record medium the speed of the record medium ($S_t$) must be subtracted from the actual peripheral speed of the playback assembly ($S_p$) to get the effective playback speed. If the playback assembly is rotated in a direction opposite to the travel of the record medium, the speed of the record medium ($S_t$) must be added to the peripheral speed of the playback assembly ($S_p$) to get the effective playback speed.

In a typical example, for a frequency multiplication factor of twenty, in order to find the actual speed of the playback head assembly, the following speeds are noted. The record strip 10 is fed from reel 11 by the metering device 12 at a speed of 7.5 inches per second and the recording head assembly is rotated one revolution per second. The recording head assembly 15 has a circumference of 3.75 inches; therefore, the peripheral speed is 3.75 inches per second making an effective recording speed of 3.75 inches per second. Since the frequency multiplication factor of twenty is desired, and if the rotation of the playback head assembly is in the direction of the movement of the record medium, from the formula $$X=\frac{S_p \pm S_t}{S_t - S_r}$$

it is seen that the peripheral speed of the record playback assembly must be 82.5 inches per second. If the rotation of the playback assembly is opposite to that of the record medium, from the formula $$X=\frac{S_p + S_t}{S_t - S_r}$$

it is seen that the peripheral speed of the playback assembly must be 67.5 inches per second.

The band-expansion technique may be applied in many situations where signals which exist in narrow-band form may be more conveniently processed by converting them to wide-band signals. For example, the band-expansion recorder may be used in conjunction with a wave analyzer to permit detailed analysis of the spectrum of a narrow band of signals. The resolving power of the wave analyzer is increased by an amount equal to the band-expansion factor. An extension of the lower frequency limit of a wave analyzer or similar measuring device is possible when the band-expansion recorder is used to shift the signals to be measured to a band within the frequency range of the instrument.

Another application of the band-expansion recorder, in conjunction with electro-acoustic transducers and suitable amplifying equipment, is to render audible sounds which occur at frequencies below the range of human hearing while maintaining in strict proportionality the relationship of all frequencies present in the signal. As an example, the subaudible band from 6.4 cycles per second to 12.8 cycles per second can be expanded by a factor of 20 times to yield at the output of the expander the audible frequency band from 128 cycles per second to 256 cycles per second.

Obviously many modifications and variations of the present invention are possible in the light of the above teaching. It is therefore, to be understood that within the scope of the appended claims, the invention may be practiced otherwise than as specifically described.

What is claimed is:

1. A record/playback device comprising a record medium, a rotable recording head assembly with a plurality of recording heads thereon positioned along the peripheral surface thereof, said recording heads being equally spaced, alternately staggered and connected to a common signal source thereof, and adapted to record at least two record tracks on said record medium with one half of each recorded portion of one track being the same as the alternate recorded portion of the other track, a rotatable playback assembly with a plurality of playback heads thereon positioned along the peripheral surface thereof, each of said rotatable playback heads having sufficient gap width to simultaneously scan and reproduce signals from both of said record tracks, means for moving said record medium along a path in which said record medium contacts a portion of the peripheral surface of said recording head assembly and said playback head assembly, said record medium having a speed greater than the peripheral speed of said recording head assembly and in the same direction of travel, said speed difference providing an effective recording speed which is less than the speed of said record medium which reduces wow and flutter during recording signals on said record medium.

2. A record/playback device according to claim 1 wherein the peripheral speed of said playback head assembly is much greater than the speed of said record medium.

References Cited in the file of this patent

UNITED STATES PATENTS

| | | |
|---|---|---|
| 2,170,751 | Gabrilovitch | Aug. 22, 1939 |
| 2,352,023 | Schuller | June 20, 1944 |
| 2,539,837 | Howell | Jan. 30, 1951 |
| 2,661,397 | Berens et al. | Dec. 1, 1953 |
| 2,755,422 | Livingston | July 17, 1956 |